United States Patent
Adachi

[11] Patent Number: 5,820,514
[45] Date of Patent: Oct. 13, 1998

[54] CONTINUOUSLY VARIABLE TRANSMISSION CONTROLLER AND CONTROL METHOD

[75] Inventor: Kazutaka Adachi, Kanagawa, Japan

[73] Assignee: Nissan Motor Co., Ltd., Kanagawa, Japan

[21] Appl. No.: 840,152

[22] Filed: Apr. 11, 1997

[30] Foreign Application Priority Data

Apr. 12, 1996 [JP] Japan .................................. 8-091158

[51] Int. Cl.$^6$ ............................................... F16H 9/00
[52] U.S. Cl. ................................................ 477/46; 477/48
[58] Field of Search ................................. 477/46, 44, 45, 477/48; 474/18, 28

[56] References Cited

U.S. PATENT DOCUMENTS

| | | | |
|---|---|---|---|
| 5,611,748 | 3/1997 | Kashiwabara | 477/47 |
| 5,628,705 | 5/1997 | Kashiwabara | 477/46 |
| 5,669,847 | 9/1997 | Kashiwabara | 477/46 |
| 5,695,428 | 12/1997 | Yuasa et al. | 477/48 |
| 5,707,314 | 1/1998 | Kashiwabara et al. | 477/48 X |
| 5,720,692 | 2/1998 | Kashiwabara | 477/46 X |

FOREIGN PATENT DOCUMENTS

| | | |
|---|---|---|
| 59-217047 | 12/1984 | Japan . |
| 3-121358 | 5/1991 | Japan . |
| 7-86991 | 3/1995 | Japan . |
| 7-98712 | 4/1995 | Japan . |
| 8-178055 | 7/1996 | Japan . |

Primary Examiner—Charles A. Marmor
Assistant Examiner—Peter T. Kwon
Attorney, Agent, or Firm—McDermott, Will & Emery

[57] ABSTRACT

An external disturbance compensating output computing unit comprising a low pass filter is provided in a speed change controller of a continuously variable transmission. A real speed change ratio, and an actuator position signal or a speed change ratio command value are input to the external disturbance compensating output computing unit. The actuator position signal or speed change ratio command value of a speed change mechanism control unit are selectively assigned to a value input to the low pass filter according to a difference between the real speed change ratio and a target speed change ratio. When the difference between the real speed change ratio and target speed change ratio is small, non-linear characteristics of the speed change mechanism are compensated, and when the difference is large, the non-linear characteristics of the speed change mechanism are not compensated. In this way, a desired speed change response is obtained regardless of driving conditions.

10 Claims, 14 Drawing Sheets

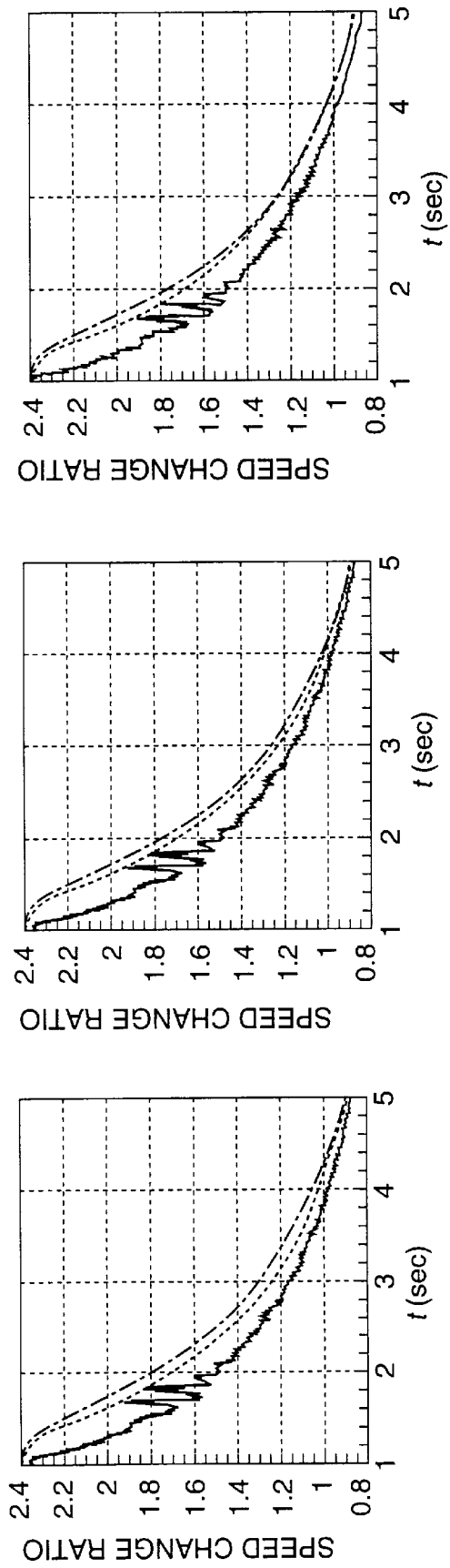

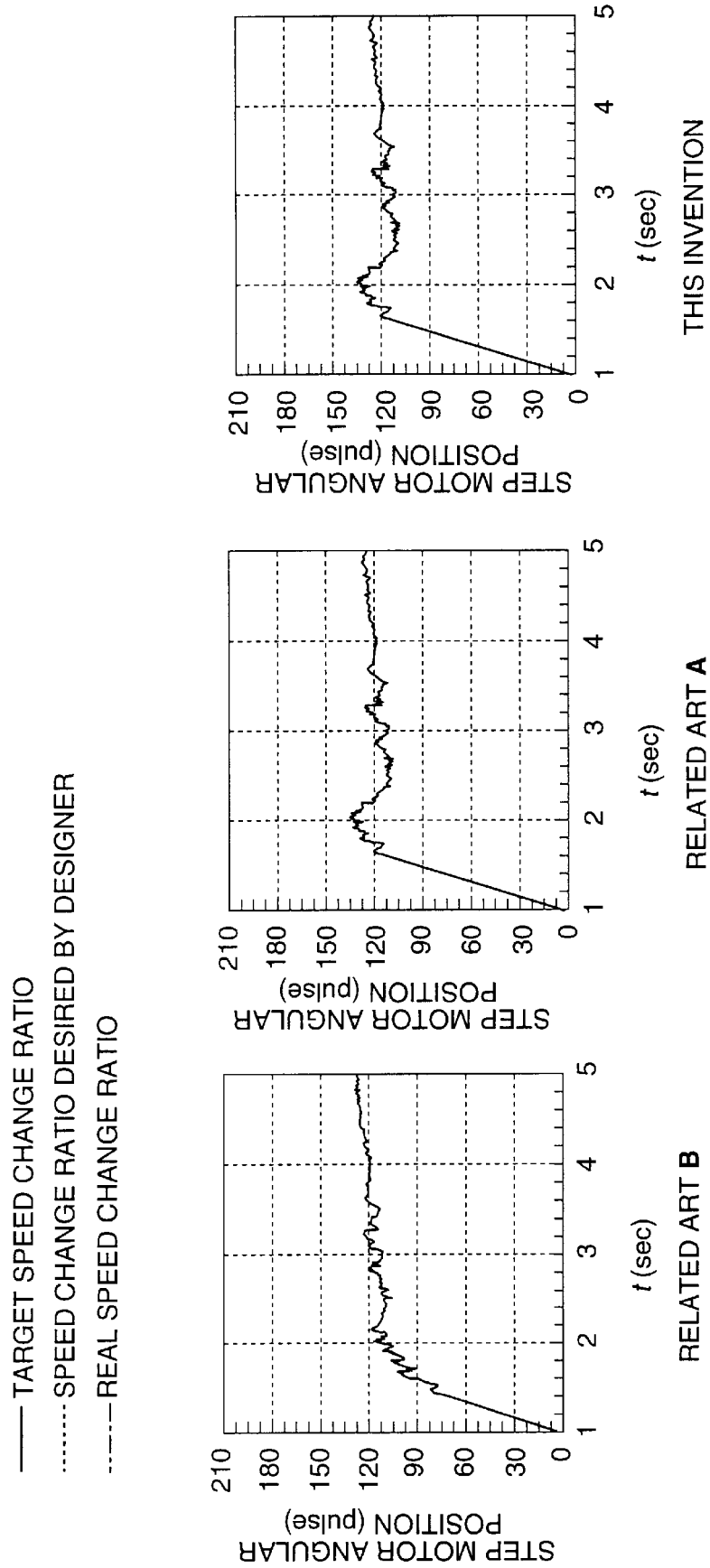

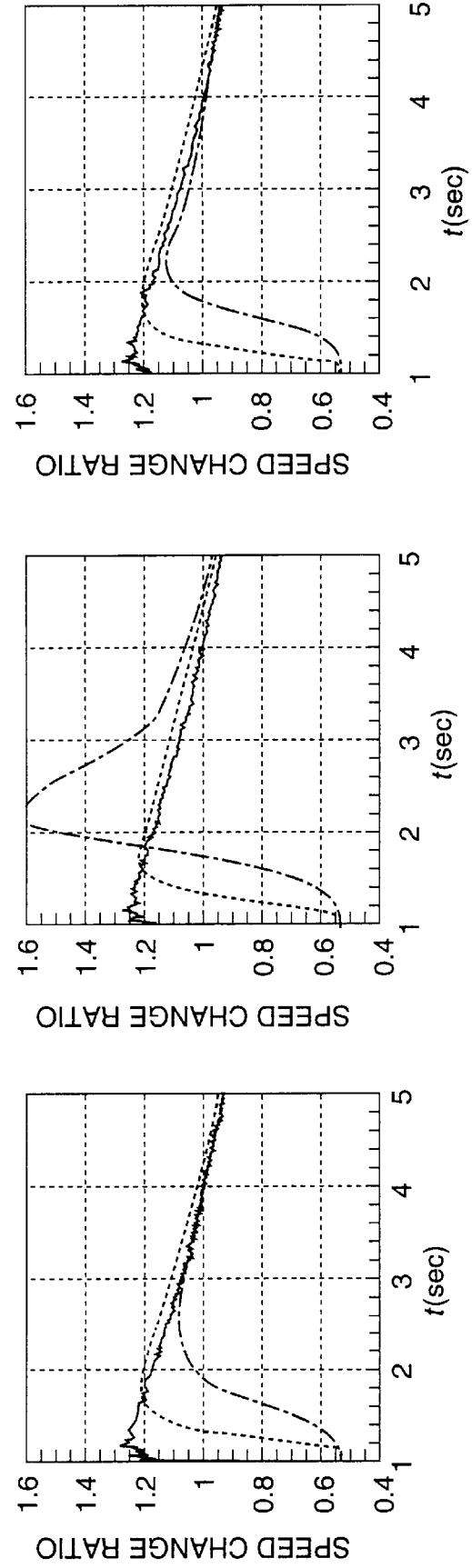

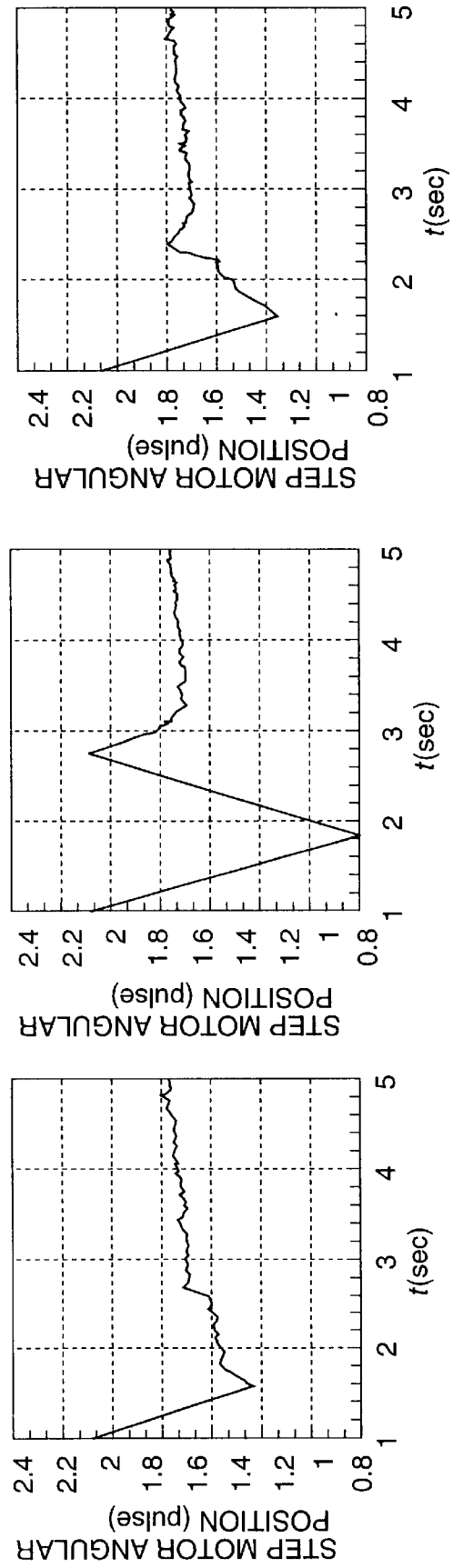

CONTINUOUSLY VARIABLE TRANSMISSION CONTROLLER AND CONTROL METHOD

FIELD OF THE INVENTION

This invention relates to control of a continuously variable transmission for a vehicle.

BACKGROUND OF THE INVENTION

A continuously variable transmission system for a vehicle for example comprises a hydraulic transmission such as a torque converter or fluid coupling and a continuously variable transmission (referred to hereafter as CVT). The hydraulic transmission transmits an engine rotation output to CVT, and CVT changes the rotation speed of the engine output in a stepless mode and transmits it to a vehicle drive shaft.

CVT is disclosed for example in Tokkai Hei 3-121358 published in 1991, and Tokkai Sho 59-217047 published in 1984 by the Japanese Patent Office.

Such a CVT has an arbitrary speed change ratio, a rotational force being communicated via for example a V-belt looped around a drive pulley and a driven pulley. The speed change ratio can be continuously varied by increasing the width of one pulley and decreasing the width of the other, and oil pressure supplied through a control valve acts on each pulley so as to change its width. The speed change ratio is therefore varied by increasing and decreasing the opening of the control valve.

In this case, a target speed change ratio is preset according to driving conditions such as engine rotation speed and engine load. A control mechanism feedback controls the opening of the control valve so that, for example, the real rotational speed of the CVT output shaft coincides with a rotation speed corresponding to a set speed change ratio based on vehicle driving conditions.

In this transmission system, the control mechanism is designed so that an optimal speed change response is obtained according to expected driving conditions to improve the vehicle's acceleration performance, fuel consumption and drivability. However due to changes of dynamic characteristics and the effect of external disturbances, it may occur that the CVT does not show the designed speed change response even when the control mechanism issues a suitable speed change command value.

SUMMARY OF THE INVENTION

It is therefore an object of this invention to obtain an expected speed change response under various driving conditions.

It is a further object of this invention to prevent overshoot of the speed change ratio during speed change control.

In order to achieve the above objects, this invention provides a controller for such a continuously variable transmission that converts and transmits a rotation speed of an output shaft of a vehicle engine in a stepless manner via an actuator to a drive shaft of the vehicle. The controller comprises a mechanism for detecting a running state of the vehicle, a mechanism for setting a target speed change ratio from the running state of the vehicle, a mechanism for detecting a real speed change ratio of the transmission, a mechanism for computing a dynamic characteristic estimated value based on the real speed change ratio of the transmission, a mechanism for computing a first speed change ratio command value from the dynamic characteristic estimated value, the target speed change ratio, and the real speed change ratio, a mechanism for computing an operation command value depending on a final speed change ratio command value, a mechanism for controlling the actuator based on the operation command value, a mechanism for computing a speed change ratio conversion value corresponding to a speed change ratio from the operation command value, a mechanism for determining a low pass filter input value by applying the speed change ratio conversion value and the speed change ratio command value with a predetermined low pass filter input adjusting coefficient, a mechanism for computing a first external disturbance compensating output value by inputting the low pass filter input value to a preset input low pass filter, a mechanism for computing a second external disturbance compensating output value by inputting the real speed change ratio to a preset filter, a mechanism for outputting an external disturbance compensating output value obtained by subtracting the first external disturbance compensating output value from the second external disturbance compensating output value, and a mechanism for computing the final speed change ratio command value by subtracting the external disturbance compensating output value from the first speed change ratio command value.

It is preferable that the low pass filter is specified by the following equation A and the preset filter is specified by the following equation B.

Equation A:

First external disturbance compensating output value $$= \frac{1}{T_H(i_p) \cdot s + 1} \cdot e^{-L \cdot s} \cdot i_{pL}$$

where, $T_H(i_p)$=cutoff frequency of the low pass filter
L=dead time
s=Laplacian operator
$i_{pL}$=low pass filter input value Equation B:
Second external disturbance compensating output value $$= \frac{T_P(i_p) \cdot s + 1}{T_H(i_p) \cdot s + 1} \cdot i_{pR}$$

where, $T_p(i_p)$=time constant of CVT
$i_{pR}$=preset filter input value

It is also preferable that the low pass filter input value determining mechanism determines the low pass filter input adjusting coefficient based on a difference between the target speed change ratio and the real speed change ratio.

It is further preferable that the low pass filter input value determining mechanism comprises a mechanism for setting the low pass filter input adjusting coefficient such that only the speed change ratio command value is applied to the low pass filter input value when a difference between the target speed change ratio and the real speed change ratio is less than a first predetermined value, and only the speed change ratio conversion value is applied to the low pass filter input value when the difference exceeds a second predetermined value larger than the first predetermined value.

It is still further preferable that the low pass filter input value determining mechanism determines a low pass filter input value by the equation:

Low pass filter input value =
(low pass filter input adjusting coefficient) × (speed change ratio command value) + (low pass filter input adjusting coefficient − 1) × (speed change ratio conversion value)

wherein, the low pass filter input adjusting coefficient setting mechanism decreases the low pass filter input adjusting coefficient from 1 to 0 as a difference between the target speed change ratio and the real speed change ratio approaches the second predetermined value from the first predetermined value.

This invention also provides a method for controlling such a continuously variable automatic transmission that converts and transmits a rotation speed of an output shaft of a vehicle engine in a stepless manner via an actuator to a drive shaft of the vehicle. The control method comprises the steps of detecting a driving state of the vehicle, setting a target speed change ratio from a detected driving state, detecting a real speed change ratio of the transmission, computing a predetermined dynamic characteristic estimated value based on the real speed change ratio of the transmission, computing a first speed change ratio command value from the dynamic characteristic estimated value, the target speed change ratio, and the real speed change ratio, computing an operation command value depending on a final speed change ratio command value, controlling the actuator based on the operation command value computing a speed change ratio conversion value corresponding to a speed change ratio from the operation command value, determining a low pass filter input value by applying the speed change ratio conversion value and the speed change ratio command value with a predetermined low pass filter input adjusting coefficient, computing a first external disturbance compensating output value by inputting the low pass filter input value to a preset input low pass filter, computing a second external disturbance compensating output value by inputting the real speed change ratio to a preset filter, outputting an external disturbance compensating output value obtained by subtracting the first external disturbance compensating output value from the second external disturbance compensating output value, and computing the final speed change ratio command value by subtracting the external disturbance compensating output value from the first speed change ratio command value.

It is preferable that the low pass filter is specified by the following Equation A and the preset filter is specified by the following Equation B.

Equation A:
First external disturbance compensating output value $$= \frac{1}{T_H(i_p) \cdot s + 1} \cdot e^{-L \cdot s} \cdot i_{pL}$$

where,
$T_H(i_p)$=cutoff frequency of the low pass filter
L=dead time
s=Laplacian operator
$i_{pL}$=low pass filter input value
Equation B:
Second external disturbance compensating output value $$= \frac{T_P(i_p) \cdot s + 1}{T_H(i_p) \cdot s + 1} \cdot i_{pR}$$

where, $T_p(i_p)$=time constant of CVT
$i_{pR}$=preset filter input value

It is also preferable that the low pass filter input value determining step determines the low pass filter input adjusting coefficient based on a difference between the target speed change ratio and the real speed change ratio.

It is further preferable that the low pass filter input value determining step comprises a step of setting a low pass filter input adjusting coefficient such that only the speed change ratio command value is applied to the low pass filter input value when a difference between the target speed change ratio and the real speed change ratio is less than a first predetermined value, and only the speed change ratio conversion value is applied to the low pass filter input value when the difference exceeds a second predetermined value larger than the first predetermined value.

It is still further preferable that the low pass filter input value determining step determines a low pass filter input value by the following equation:

Low pass filter input value =
(low pass filter input adjusting coefficient) × (speed change ratio command value) + (low pass filter input adjusting coefficient − 1) × (speed change ratio conversion value)

wherein, the low pass filter input adjusting coefficient setting step decreases the low pass filter input adjusting coefficient from 1 to 0 as a difference between the target speed change ratio and the real speed change ratio approaches the second predetermined value from the first predetermined value.

The details as well as other features and advantages of this invention are set forth in the remainder of the specification and are shown in the accompanying drawings.

BRIEF DESCRIPTION OF THE DRAWINGS

FIGS. 11A–11F are graphs showing simulation results comparing the variations of step motor position and speed change ratio when the vehicle is starting under the control of the first embodiment and when the vehicle is starting under the control of related arts which were developed by a group including the inventor prior to this invention.

FIGS. 12A–12F are similar to FIGS. 11A–11F but showing simulation results during kick down.

DESCRIPTION OF THE PREFERRED EMBODIMENTS

Figure 1:
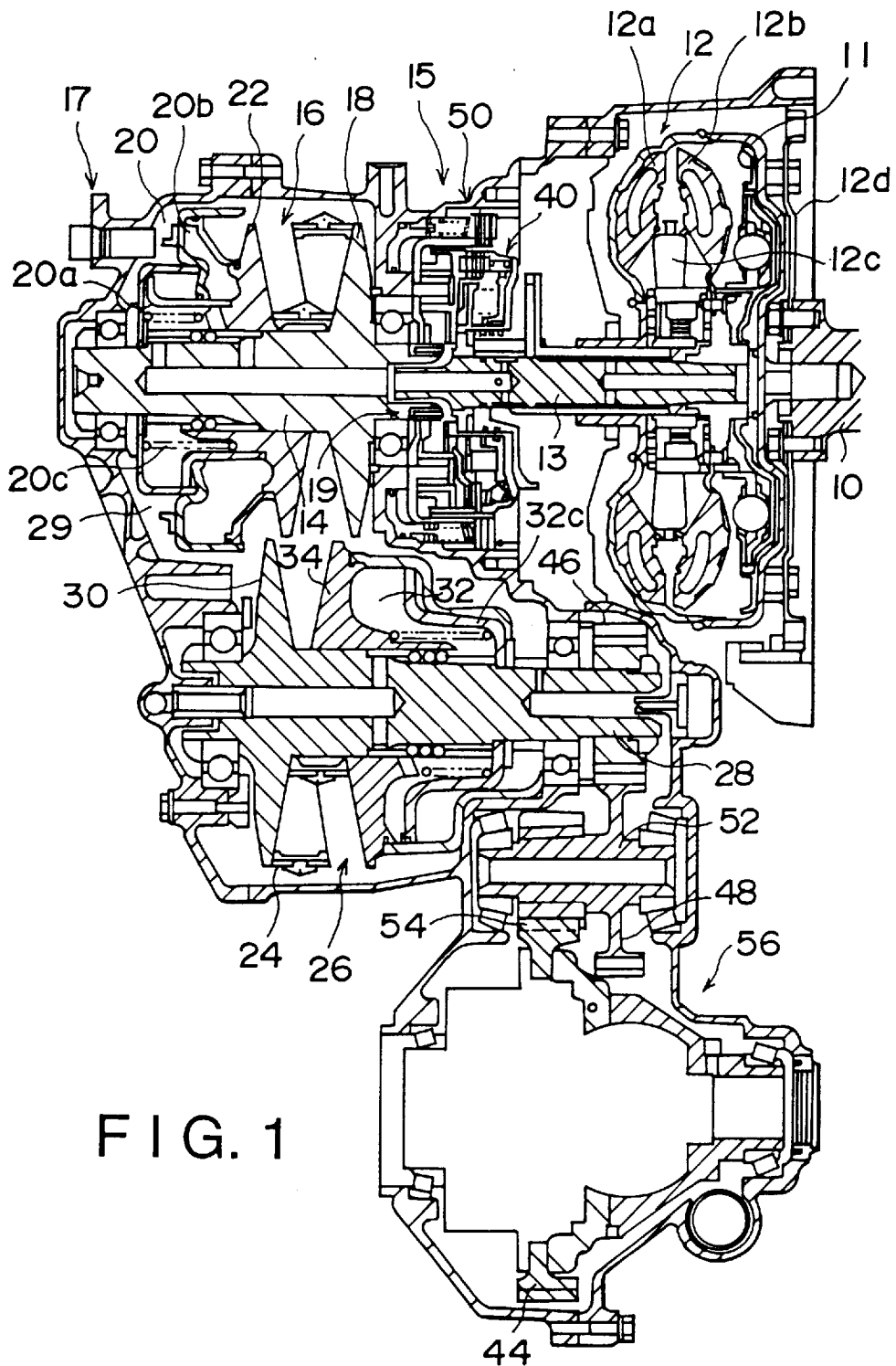
FIG. 1 is a longitudinal sectional view of a continuously variable transmission to which this invention is applied.

Referring to FIG. 1 of the drawings, a torque converter 12 is connected to an engine output shaft 10.

The torque converter 12 comprises a lockup clutch 11. The lockup clutch 11 mechanically connects or disconnects an impeller 12a which is an input part and a turbine 12b which is an output part according to the oil pressure supplied to a converter chamber 12c and a lockup oil chamber 12d.

The turbine 12b is connected to a rotation shaft 13, the rotation shaft 13 being connected to a forward/reverse change-over mechanism 15. The mechanism 15 comprises a planetary gear mechanism 19, forward clutch 40 and reverse brake 50. The output shaft of the mechanism 19 is connected to a drive shaft 14 formed coaxially with the rotation shaft 13. The drive shaft 14 comprises the input shaft of a continuously variable transmission (CVT) 17. It should be noted that a fluid coupling or an electromagnetic clutch may be used instead of the torque converter 12.

The CVT 17 comprises a drive pulley 16 and driven pulley 26, and a V-belt 24 which transmits the rotation of the drive pulley 16 to the driven pulley 26, as described hereinabove.

The drive pulley 16 comprises a fixed conical plate 18 which rotates together with the drive shaft 14 and a movable conical plate 22 disposed relative to the fixed conical plate 18 forming a V-shaped pulley groove with the fixed conical plate 18. The movable conical plate 22 moves in the axial direction of the drive shaft 14 according to an oil pressure acting on a drive pulley cylinder chamber 20 while it rotates with the fixed conical plate 18. The drive pulley cylinder chamber 20 comprises a chamber 20a and chamber 20b. The movable conical plate 22 has a pressure receiving surface larger that of a movable conical plate 34 described hereinafter.

The driven pulley 26 is installed on a driven shaft 28. The driven pulley 26 comprises a fixed conical plate 30 which rotates together with the driven shaft 28 and a movable conical plate 34 disposed relative to the fixed conical plate 30 forming a V-shaped pulley groove with the fixed conical plate 30. The movable conical plate 34 moves in the axial direction of the driven shaft 28 according to an oil pressure acting on a driven pulley cylinder chamber 32 while it rotates with the fixed conical plated 30.

The driven pulley 28 is provided with a drive gear 46 which rotates together with the pulley 28. The drive gear 46 engages with an idler gear 48 on an idler shaft 52. The idler shaft 52 comprises a pinion gear 54 which rotates together with the shaft 52. The pinion gear 54 engages with a final gear 44. The final gear 44 drives a propeller shaft or drive shaft, not shown, via a differential unit 56.

The rotation input to the CVT 17 from the engine output shaft 10 is transmitted to the forward/reverse change-over mechanism 15 via the torque converter 12 and rotation shaft 13. When the forward clutch 40 is engaged and the reverse brake 50 is released, the rotation of the rotation shaft 13 is transmitted to the drive shaft 14 of the transmission 17 with the same rotation direction via the planetary gear mechanism 19 whereof the input shaft and output shaft rotate together. On the other hand, when the forward clutch 40 is released and the reverse brake 50 is engaged, the rotation of the rotation shaft 13 is transmitted to the drive shaft 14 with the opposite rotation direction due to the action of the planetary gear mechanism 19.

The rotation of the drive shaft 14 is transmitted to the differential unit 56 drive pulley 16, V-belt 24, driven pulley 26, driven shaft 28, drive gear 46, idler gear 48, idler shaft 52, pinion gear 54 and final gear 44. When the forward clutch 40 and reverse brake 50 are both released, the forward/reverse change-over mechanism 15 goes into neutral, and transmission of a rotation from the rotation shaft 13 to the drive shaft 14 does not occur.

In the aforesaid dynamic transmission, the rotation ratio, i.e. speed change ratio (deceleration ratio) between the drive pulley 16 and driven pulley 26 varies when the movable conical plate 22 of the drive pulley 16 and movable conical plate 34 of the driven pulley 26 are moved in axial direction so as to alter the contact point radius with the V-belt 24. For example, if the width of the V-shaped pulley groove of the drive pulley 16 is enlarged and the width of the V-shaped pulley groove of the driven pulley 26 is narrowed, the contact point radius of the V-belt 24 on the side of the drive pulley 16 decreases and the contact point radius of the V-belt 24 on the side of the driven pulley 24 increases, so a large deceleration ratio is obtained. When the movable conical plates 22, 34 are moved in the opposite direction, the deceleration ratio becomes smaller.

This control of the widths of the V-shaped pulley grooves of the drive pulley 16 and driven pulley 26 is performed by controlling the relative pressures of the drive pulley cylinder chamber 20 (20a, 20b) and driven pulley cylinder chamber 32 via a control system described hereinafter.

Figure 2:
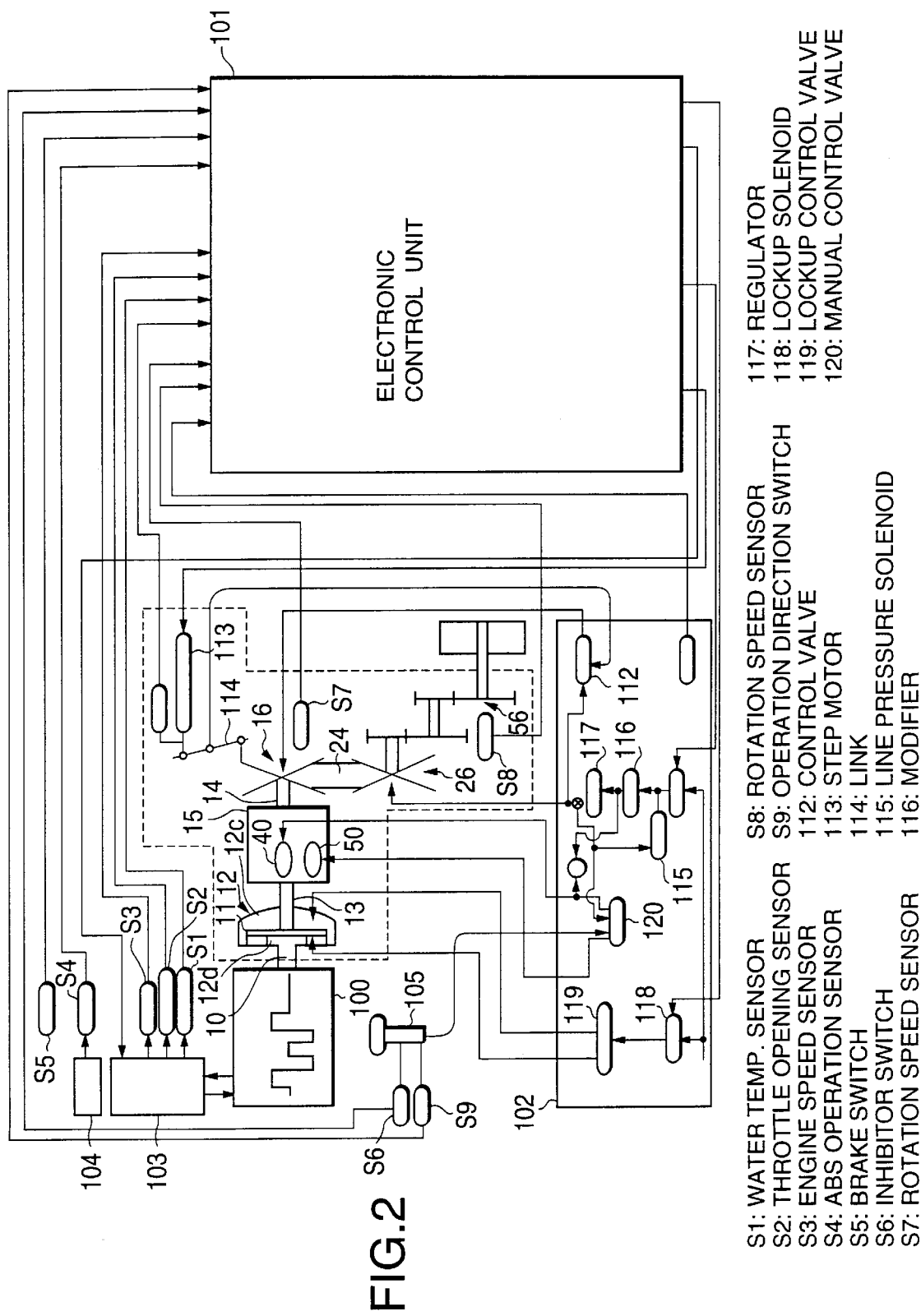
FIG. 2 is a schematic diagram of a control unit according to this invention.

The rotation ratio of the CVT 17 is controlled by the control unit shown in FIG. 2. The same symbols are used as for the mechanism in FIG. 1.

In FIG. 2, 101 is an electronic control unit comprising a microprocessor, and 102 denotes a hydraulic control unit comprising various oil pressure control valves. In this control system, the main means of controlling the aforesaid CVT are the electronic control unit 101 and the hydraulic control unit 102.

The electronic control unit 101 is a microcomputer comprising a central processing unit (CPU), read-only memory (ROM), random access memory (RAM) and input/output interface. Signals are input to the electronic control unit 101 from a water temperature sensor S1, throttle opening sensor S2, engine rotation speed sensor S3, ABS operation sensor S4 which detects the operation of an antilock braking system (ABS) controller 104, brake switch S5 which turns on according to the braking of the vehicle, inhibitor switch S6 showing the operating position of a selector lever 105, rotation speed sensor S7 which detects the rotation speed of the drive pulley 16, and a rotation speed sensor S8 which detects the rotation speed of the driven pulley 26.

The electronic control unit 101 performs predetermined calculations using these signals so as to control the speed change ratio of the CVT 17, line pressure and lock up clutch 11.

Describing these control functions in detail, the electronic control unit 101 outputs a drive signal to a step motor 113 based on a predetermined pattern according to engine load, engine rotation speed and vehicle speed represented by the throttle opening. The throttle opening is detected by a throttle opening sensor S2, the engine rotation speed is detected by an engine rotation speed sensor S3, and the vehicle speed is detected by a rotation speed sensor S8 which detects the rotation speed of the driven pulley 26.

The step motor 113 drives a speed control valve 112 of an oil pressure control unit 102 so that a speed change ratio corresponding to this drive signal is obtained, controls the line pressure supplied to the drive pulley cylinder chamber 20 shown in FIG. 1, and varies the relative pressures of the drive pulley cylinder chamber 20 and driven pulley cylinder chamber 32.

The displacement position of the drive belt pulley 16, i.e. the speed change ratio, is fed back to the speed control valve 112 via a link 114. After a target speed change ratio corresponding to the position of the step motor 113 is achieved by this feedback control, the electronic control unit 101 fixes the relative pressures of the pulley cylinder chambers 20 and 32 so as to maintain the speed change ratio.

When the line pressure acting on the pulleys 16 and 26 is too small in the speed change ratio control of the CVT 17, the frictional force between the pulleys 16,18 and V-belt 24 is insufficient so the V-belt 24 slips. Conversely when the line pressure is too large, the frictional force increases uselessly. In both cases, this has an adverse effect on fuel costs and the driving performance of the vehicle. The line pressure is therefore controlled so that a suitable drive force which is neither too large nor too small is transmitted according to the driving conditions.

The electronic control unit 101 controls the position of a line pressure solenoid 115 of the oil pressure control unit 102 according to a control signal. After the line pressure solenoid 115 has adjusted the oil pressure pump, not shown, to a suitable line pressure via a modifier (pressure control valve) 116 and regulator (fixed pressure valve) 117, this line pressure is supplied to the driven pulley cylinder chamber 32. It is also supplied to the driven pulley cylinder chamber 20 via a speed change control valve 112. Also, control is performed so that the lockup clutch 11 is connected when for example the vehicle speed is greater than a predetermined value, and released when it is less than the predetermined value.

The electronic control unit 101 outputs a signal according to the vehicle speed to a lock up solenoid 118 of the oil pressure control unit 102, and thereby switches changes over a lock up control-valve 119. The lockup control-valve 119 switches over between a system which supplies the pressure of the oil pump to the converter chamber 12c of the torque converter 12 as an applied pressure of the lockup clutch 11 so releasing a lockup oil chamber 12d, and a system which supplies the oil pressure of the oil pump to the lockup oil chamber 12d as a release pressure so releasing the converter chamber 12c.

A manual control valve 120 which operates in synchronism with a selector lever 105 is provided in the oil pressure control unit 102. The manual control valve 120 supplies oil pressure which is supplied from the oil pressure pump via the line pressure solenoid 115, selectively to a forward clutch 40 and reverse clutch of a forward/reverse change-over mechanism 15 according to the operating position of the selector lever 105. This permits the forward/reverse change-over mechanism 15 to be changed between the forward, reverse and neutral positions.

The above CVT and the basic construction of its controller are described in for example Tokkai Hei 8-178055 published by the Japanese Patent Office.

This invention has distinctive features regarding the construction of a speed change controller 106 over the aforesaid prior art.

Figure 3:
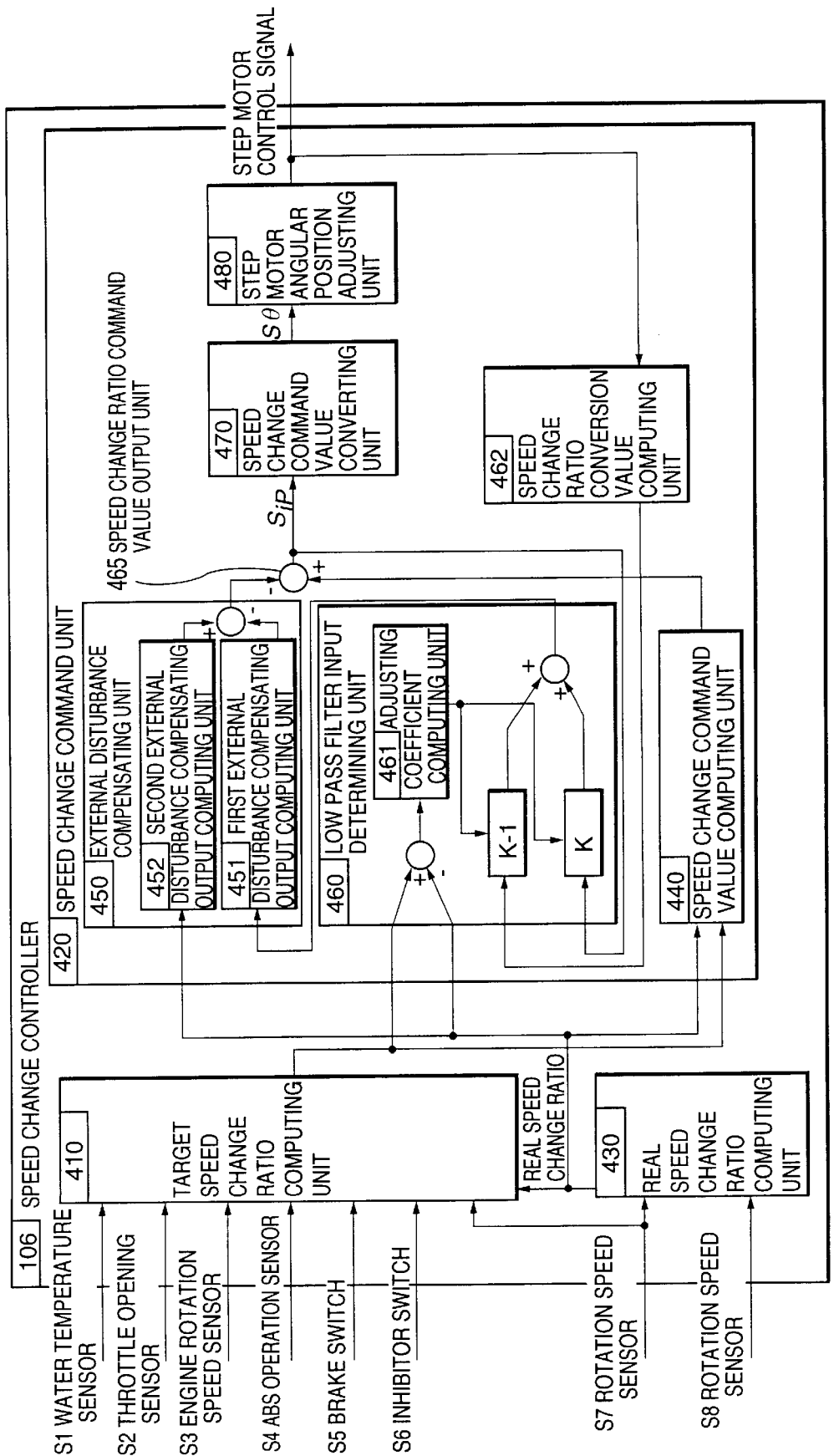
FIG. 3 is a block diagram showing the construction of a speed change controller of a control unit.

As shown in FIG. 3, the speed change controller 106 comprises a target speed change ratio computing unit 410 which computes a target speed change ratio $i_{pT}$ corresponding to a driving state based on driving state signals, a speed change command unit 420 which outputs a step motor drive signal Sθ based on a comparison of the target speed change ratio $i_{pT}$ and a real speed change ratio $i_{pR}$, a real speed change ratio computing unit 430 which computes the real speed change ratio $i_{pR}$ of the CVT 17 from rotation speed signals of a drive pulley 16 and a driven pulley 26, and a speed change command value computing unit 440 which performs a computation of a speed change ratio command value $Si_p$.

The speed change command unit 420 comprises an external disturbance compensating unit 450, a low pass filter input determining unit 460, a speed change ratio conversion value computing unit 462, a speed change ratio command value output unit 465, a speed change command value converting unit 470 and a step motor angular position adjusting unit 480. The external disturbance compensating unit 450 comprises first and second external disturbance compensating output computing units 451 and 452.

The low pass filter input determining unit 460 comprises an adjusting coefficient computing unit 461.

Figure 4:
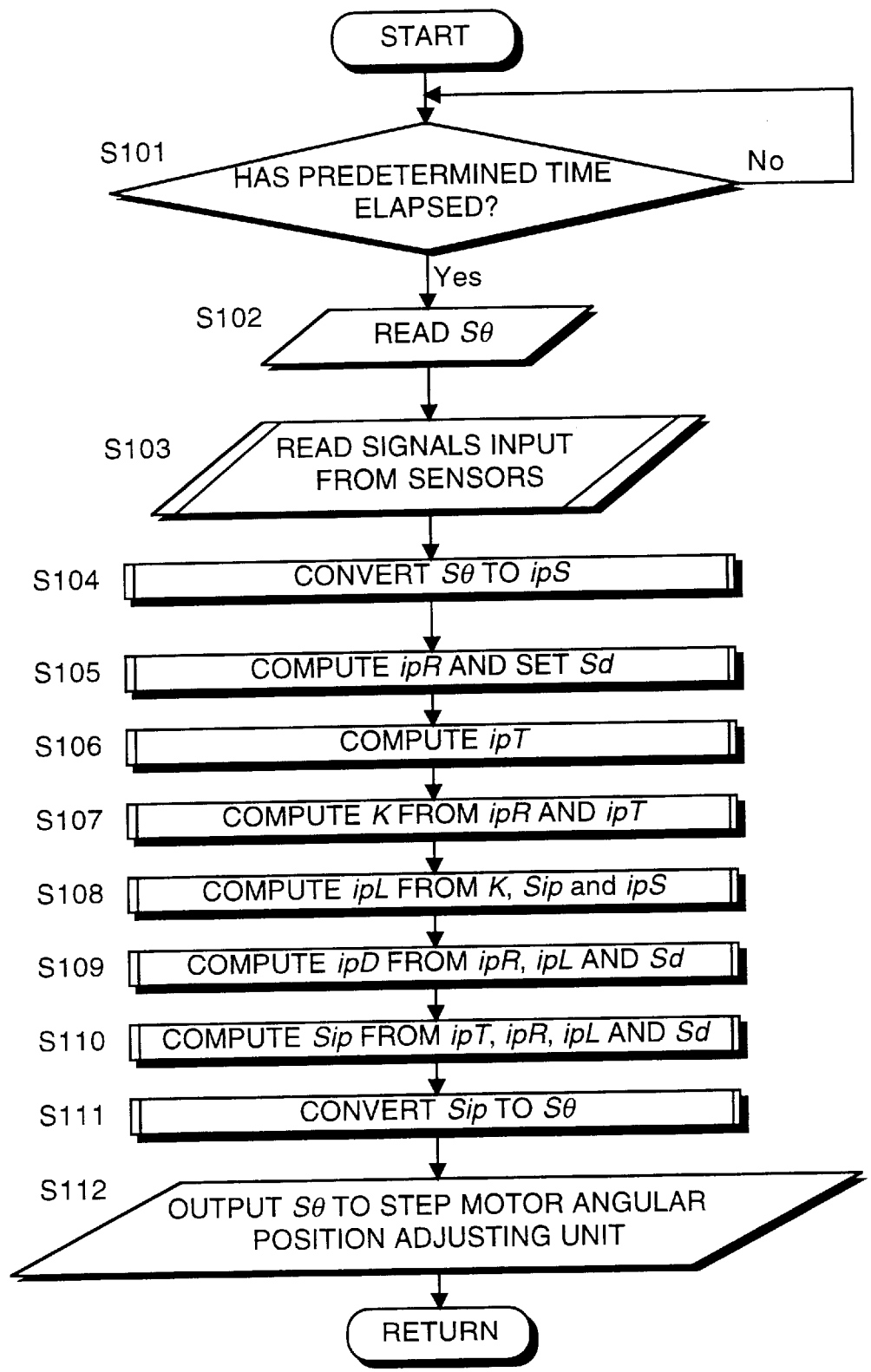
FIG. 4 is a flow chart describing a speed change control process performed by the control unit.
Figure 5:
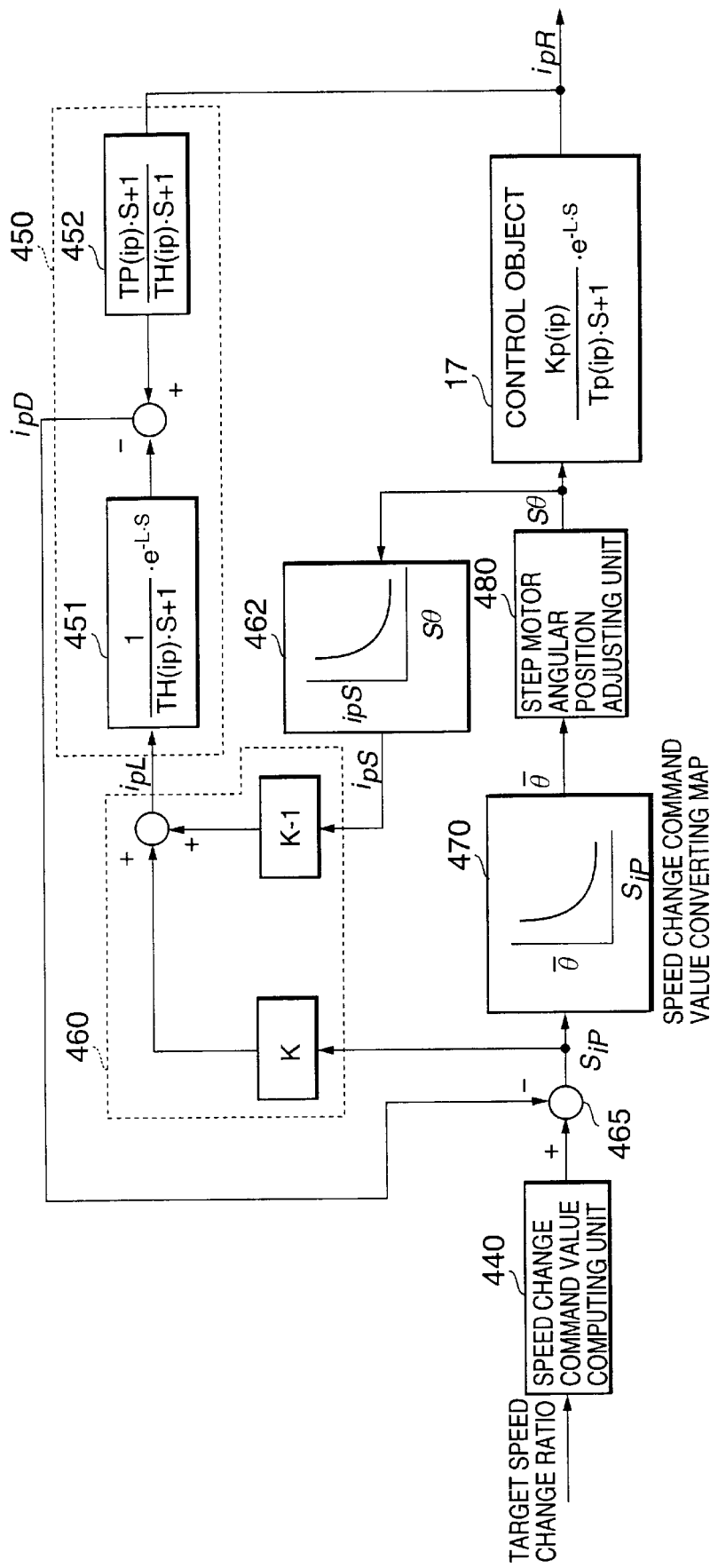
FIG. 5 is a control diagram describing the function of a disturbance compensating unit of the speed change controller.

Based on the above construction, the speed change controller 106 performs speed change control according to the control diagram of FIG. 5 and flowchart of FIG. 4.

First in a step S101, in order to execute the process at a fixed interval, it is determined whether or not a predetermined time has elapsed from the immediately preceding execution of the process. In a step S102, an output signal Sθ of the step motor angular position adjusting unit 480 is read.

In a step S103, signals are read from various sensors shown in FIGS. 2 and 3.

Figure 6:
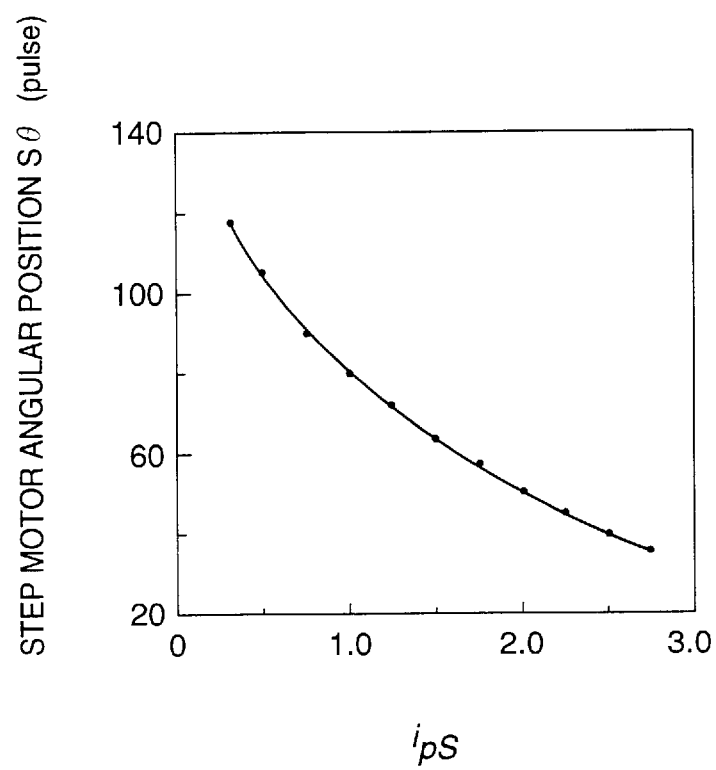
FIG. 6 is a graph showing the contents of a map specifying the relation of a step motor angular position and speed change ratio stored by the control unit.
Figure 7:
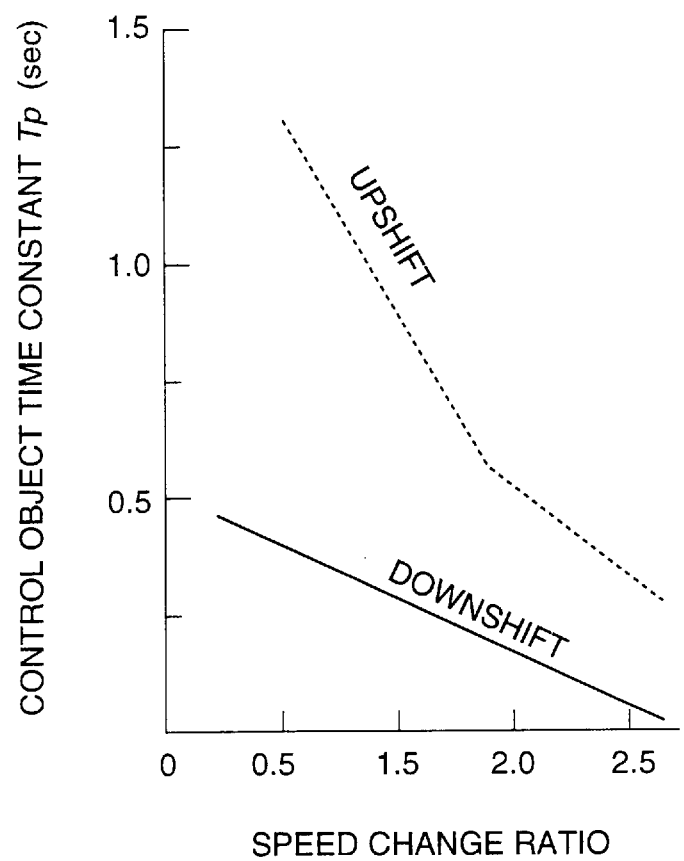
FIG. 7 is a graph showing the contents of a map specifying the relation between the speed change ratio of CVT and a time constant stored by the control unit.

In a step S104, the low pass filter input determining unit 460 converts the output signal Sθ to a speed change ratio command value $i_{pS}$. The speed change ratio command value $i_{pS}$ is obtained by the speed change ratio conversion value computing unit 462 searching a conversion map shown in FIG. 5 based on the step motor angle Sθ. This map is effectively the same as a conversion map shown in FIG. 6 provided in the speed change ratio command value conversion unit 470.

In a step S105, the real speed change ratio conversion unit 430 computes a real speed change ratio $i_{pR}$ from rotation speed signals S7, S8 from the pulleys. A speed change direction value $S_d$ which shows whether the speed change ratio is increasing or decreasing is set by comparing the computed real speed change ratio $i_{pR}$ with the immediately preceding computed value.

In a step S106, a target speed change ratio computing unit 410 computes a target speed change ratio $i_{pT}$ based on the signals read in the step S103.

The dynamic characteristics $G_p(s)$ of CVT are determined by the following equation (1):

$$G_P(s) = \frac{K_P(i_p)}{T_P(i_p) \cdot s + 1} \cdot e^{-L \cdot s} \quad (1)$$

where, $K_p(i_p)$=gain of CVT $T_p(i_p)$=time constant of CVT determined for each speed change ratio and speed change direction L=dead time s=Laplacian operator The external disturbance compensating unit 450 takes the dynamic characteristics of the CVT shown in Equation (1) as a reference model. This reference model is designed to eliminate parameter fluctuations such as oil viscosity variations or scatter in performance during mass production, and fluctuations due to external disturbances.

Figure 8:
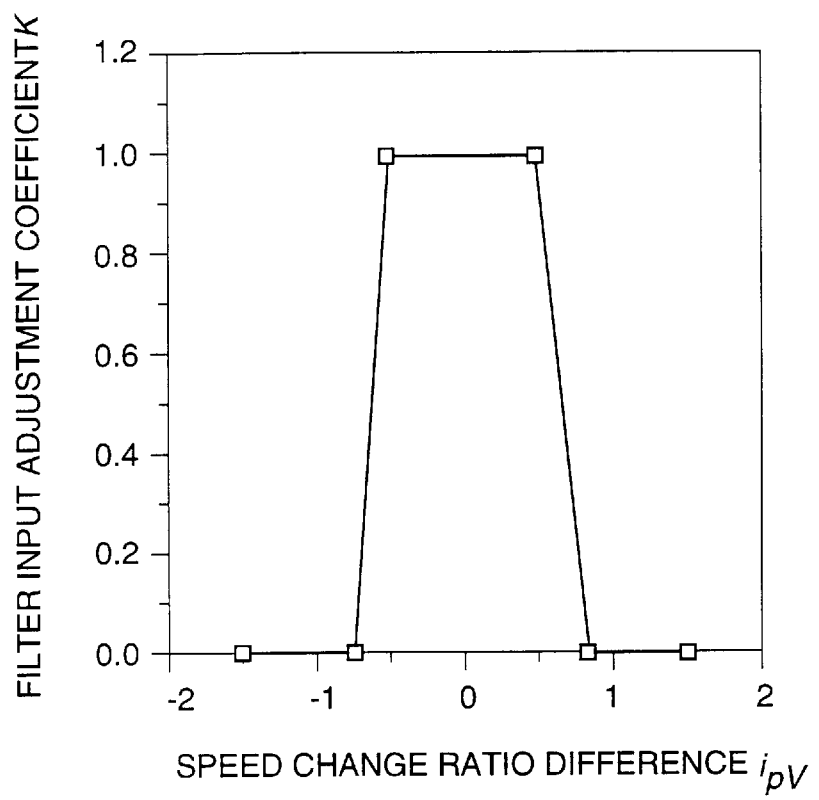
FIG. 8 is a graph showing the contents of a map of an input adjustment coefficient K of a low pass filter stored by the control unit.

In a step S107, the low pass filter input determining unit 460 determines the value of a filter input adjustment coefficient K using a map coefficient $f_{7map}$ from the target speed change ratio $i_{pT}$, speed change ratio command value $Si_p$ and real speed change ratio $i_{pR}$, based on a speed change ratio difference $i_{pV}$ between $i_{pT}$ and $i_{pR}$ as shown in the following equations (2) and (3). As shown in FIG. 8, the map coefficient $f_{7map}$ is 1 when the difference $i_{pV}$ of the speed change ratio is small, and it approaches 0 with increasing difference when the difference $i_{pV}$ is large.

$$i_{pV} = i_{pT} - i_{pR} \quad (2)$$

$$K = f_{7map}(i_{pV}) \quad (3)$$

In the next step S108, the low pass filter input determining unit 460 computes a low pass filter input value $i_{pL}$ by an Equation (4) using the adjusting coefficient K:

$$i_{pL} = K \cdot Si_p(t) + (K-1) \cdot i_{pS}(t) \quad (4)$$

where, (t) represents a value at a time t.

Figure 9:
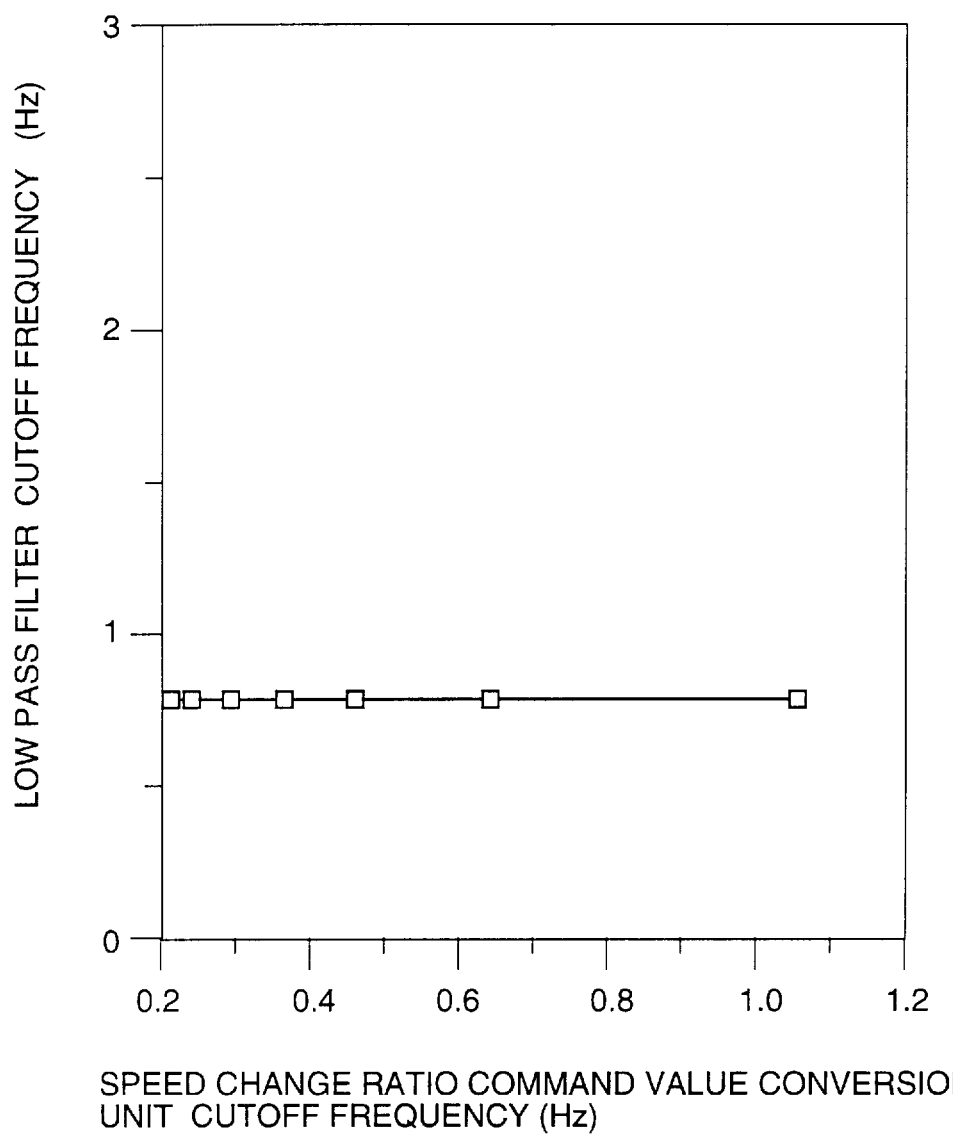
FIG. 9 is a graph showing the relation between the low pass filter and the cutoff frequency set by a speed change ratio command value computing unit of the speed change controller.

In a step S109, the external disturbance compensating unit 450 computes an external disturbance compensation output $i_{pD}$ by an Equation (5) from the low pass filter input value $Si_p$ and real speed change ratio $i_{pR}$.

$$i_{pD}(t) = \frac{T_P(i_p) \cdot s + 1}{T_H(i_p) \cdot s + 1} \cdot i_{pR}(t) - \frac{1}{T_H(i_p) \cdot s + 1} \cdot e^{-L \cdot s} \cdot i_{pL}(t) \quad (5)$$

where, $T_H(i_p)$ is a cutoff frequency of the low pass filter of the external disturbance compensating unit, and is set as shown in FIG. 9 so that the dynamic characteristics of CVT (time constant, dead time) and stability of the control system (e.g. a gain tolerance of at least 12 dB and a phase tolerance of at least 45 degrees) are satisfied.

In the next step S110, the speed change ratio command value output unit 465 outputs the speed change ratio command value $Si_p$. For this purpose, the speed change ratio command value computing unit 440 first determines the dynamic characteristics $G_T(s)$ desired by the designer from an Equation (6), and the speed change ratio command value output unit 465 calculates the speed change ratio command value $Si_p$ in an Equation (7) based on these dynamic characteristics $G_T(s)$:

$$G_T(s) = \frac{1}{T_T \cdot s + 1} \cdot e^{-L \cdot s} \quad (6)$$

$$Si_p(t) = \frac{T_P(i_p) \cdot s + 1}{T_T(i_p) \cdot s + 1} \cdot i_{pT}(t) - i_{pD}(t) \quad (7)$$

where, $T_T$ is a time constant for the design target.

The speed change ratio command value $Si_p$ computed in this way reflects dynamic characteristics for each speed change ratio and speed change direction of CVT. In other words, it reflects an initial target speed change response for any speed change ratio and speed change direction.

However, the angular position of the step motor 113 and speed change ratio of CVT are not generally in a direct proportional relationship. Therefore in a step S111, the speed change ratio command value converting unit 470 converts a step motor angular position, i.e. a drive signal Sθ, to a value corresponding to the speed change ratio command value $Si_p$ so that this direct proportional relationship holds. The drive signal Sθ thus obtained is output to the step motor angular position adjusting unit 480 in a step S112.

The next Equations (8)–(10) are used for performing this conversion. Specifically, a conversion amount of the speed change ratio command value is determined so that there is a direct proportional relationship between the speed change command value issued to the speed change control valve and speed change ratio $i_p$, based on a displacement amount $D_s$ of a drive pulley interval and the speed change ratio $i_p$ relative to the step motor angular position:

$$r_i = \frac{D_S}{2 \cdot \tan(\beta)} + r_{i0} \quad (8)$$

$$r_0 = \frac{2 \cdot r_i - \pi \cdot D_C + \sqrt{(2 \cdot r_i - \pi \cdot D_C)^2 - 4 \cdot \{r_i^2 + \pi \cdot D_C \cdot r_i + D_C \cdot (2 \cdot D_C - L_B)\}}}{2} \quad (9)$$

$$i_p = \frac{r_0}{r_i} \quad (10)$$

where,
$r_i$=radius of belt contact part of drive pulley
$r_{i0}$=minimum radius of drive pulley
$r_0$=radius of belt contact part of driven pulley
$D_c$=interaxial distance between drive pulley and driven pulley
$L_B$=circumferential length of belt
$\beta$=sheave angle of drive pulley As the specification and dimensions of CVT are known, the computational load may be lightened by reading a map of precomputed results or a map of conversion amounts based on experimental results instead of computing conversion amounts based on this conversion equation every time control is performed.

Figure 10:
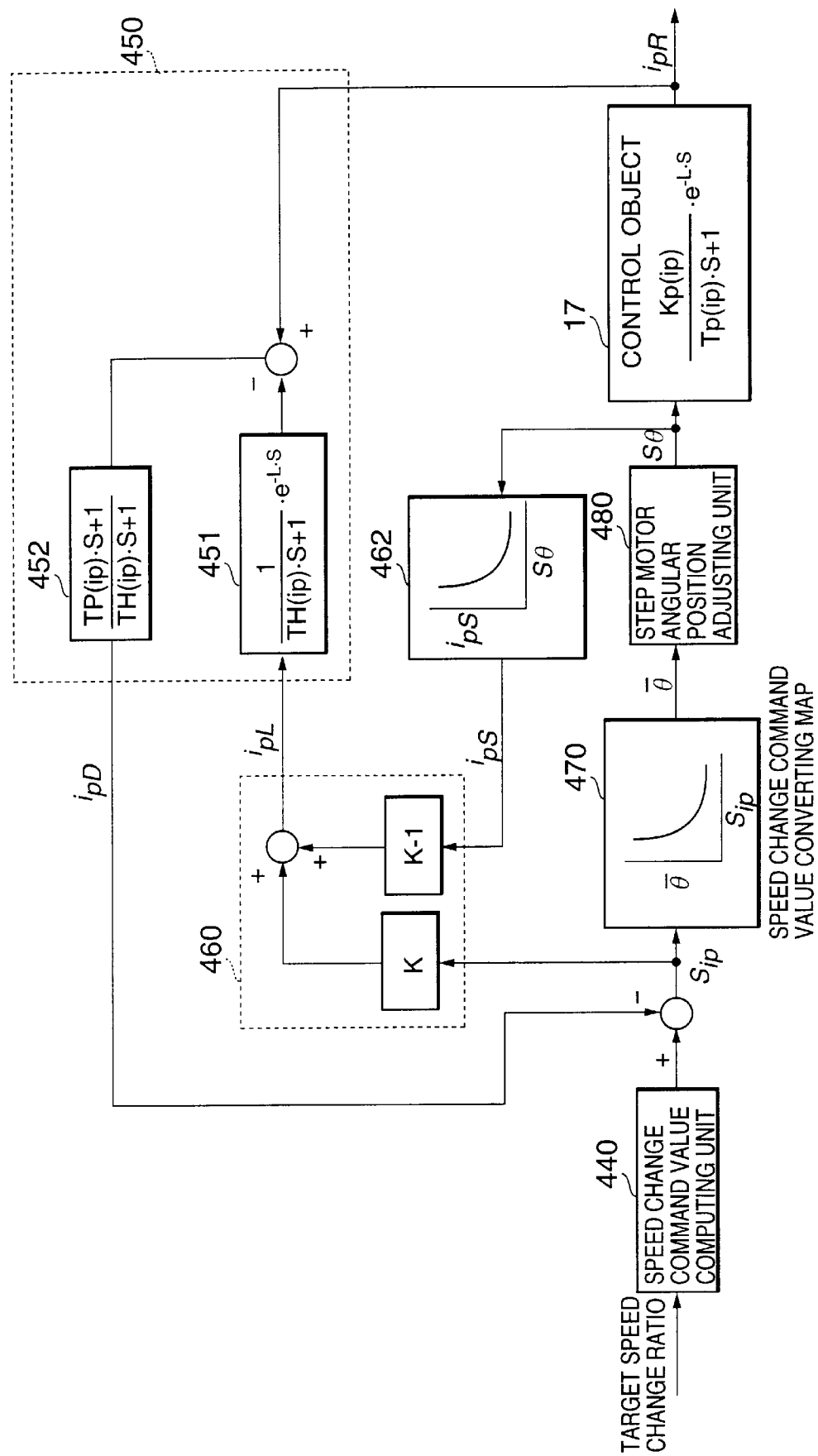
FIG. 10 is similar to FIG. 5, but showing another embodiment of this invention.

FIG. 10 shows another embodiment of this invention related to the construction of the external disturbance compensating unit.

This embodiment differs from the preceding embodiment only in that an Equation (11) is applied instead of the Equation (5).

$$i_{pD}(t) = \left\{ i_{pR}(t) - \frac{1}{T_P(i_p) \cdot s + 1} \cdot e^{-L \cdot s} \cdot i_{pL}(t) \right\} \cdot \frac{T_P(i_p) \cdot s + 1}{T_H(i_p) \cdot s + 1} \quad (11)$$

According also to this embodiment, the same results are obtained as in the first embodiment.

FIGS. 11A–11F and FIGS. 12A–12F show simulation results for a speed change controller according to the aforesaid first embodiment, and a speed change controller using related technologies A and B developed by a group including the inventor prior to this invention.

The related technology A is a speed change controller comprising a dynamic characteristic compensating unit and external disturbance compensating unit, for which application was made as Tokugan Hei 7-86991 to the Japanese Patent Office in 1995.

The related technology B is a speed change controller which attempts to correct the input to the external disturbance compensating unit not by the speed change ratio, but by the step motor angular position or step motor drive signal. The oil pressure control valve or its actuator generally has non-linear characteristics and tends to cause a loss of compliance with the set target of the speed change ratio. By applying this related technology B, however, the loss is largely reduced.

This related technology B was applied for as Tokugan Hei 7-98712 to the Japanese Patent Office in 1995.

Both of the related technologies A and B had not been known arts on the claimed priority date of the application of this invention, which is the date of the application of this invention to the Japanese Patent Office.

FIGS. 11A–11F show characteristics when the vehicle accelerates from rest, and FIGS. 12A–12F show characteristics when speed change occurs due to kickdown.

Under control by the related technology B shown in FIG. 11A, the response of the real speed change ratio tends to be delayed during conditions when the speed change ratio command value gradually increases as when the vehicle accelerates from rest. On the other hand, in the control of this invention shown in FIG. 11C, there is almost no delay in the response.

Further, under control by the related technology A shown in FIG. 12B, the speed change ratio overshoots the target value when there is a rapid speed change ratio command value due to kickdown.

On the other hand, in the control of this invention shown in FIG. 12C, a suitable speed change ratio response is obtained even in this situation.

The details as well as other features and advantages of this invention are set forth in the remainder of the specification and are shown in the accompanying drawings.

I claim:

1. A controller for a continuously variable transmission, said transmission converting and transmitting a rotation speed of an output shaft of a vehicle engine in a stepless manner via an actuator to a drive shaft of said vehicle, comprising:

means for detecting a running state of said vehicle, means for setting a target speed change ratio from the running state of said vehicle, means for detecting a real speed change ratio of said transmission, means for computing a dynamic characteristic estimated value based on the real speed change ratio of said transmission, means for computing a first speed change ratio command value from said dynamic characteristic estimated value, said target speed change ratio, and said real speed change ratio, means for computing an operation command value depending on a final speed change ratio command value, means for controlling said actuator based on said operation command value, means for computing a speed change ratio conversion value corresponding to a speed change ratio from said operation command value, means for determining a low pass filter input value by applying said speed change ratio conversion value and said speed change ratio command value with a predetermined low pass filter input adjusting coefficient, means for computing a first external disturbance compensating output value by inputting said low pass filter input value to a preset input low pass filter, means for computing a second external disturbance compensating output value by inputting said real speed change ratio to a preset filter, means for outputting an external disturbance compensating output value obtained by subtracting said first external disturbance compensating output value from said second external disturbance compensating output value, and means for computing the final speed change ratio command value by subtracting said external disturbance compensating output value from said first speed change ratio command value.

2. A controller as defined in claim 1, wherein said low pass filter is specified by the following equation A and said preset filter is specified by the following equation B;

Equation A:
First external disturbance compensating output value $$= \frac{1}{T_H(i_p) \cdot s + 1} \cdot e^{-L \cdot s} \cdot i_{pL}$$

where,
$T_H(i_p)$=cutoff frequency of the low pass filter
L=dead time
s=Laplacian operator
$i_{pL}$=low pass filter input value Equation B:
Second external disturbance compensating output value $$= \frac{T_P(i_p) \cdot s + 1}{T_H(i_p) \cdot s + 1} \cdot i_{pR}$$

where,
$T_p(i_p)$=time constant of CVT
$i_{pR}$=preset filter input value.

3. A controller as defined in claim 1, wherein said low pass filter input value determining means determines said low pass filter input adjusting coefficient based on a difference between said target speed change ratio and said real speed change ratio.

4. A controller as defined in claim 3, wherein said low pass filter input value determining means comprises means for setting said low pass filter input adjusting coefficient such that only said speed change ratio command value is applied to said low pass filter input value when a difference between said target speed change ratio and said real speed change ratio is less than a first predetermined value, and only said speed change ratio conversion value is applied to said low pass filter input value when said difference exceeds a second predetermined value larger than the first predetermined value.

5. A controller as defined in claim 4, wherein said low pass filter input value determining means determines a low pass filter input value by the equation:

---

Low pass filter input value =
(low pass filter input adjusting coefficient) × (speed change ratio command value) + (low pass filter input adjusting coefficient − 1) × (speed change ratio conversion value)

--- wherein, said low pass filter input adjusting coefficient setting means decreases said low pass filter input adjusting coefficient from 1 to 0 as a difference between said target speed change ratio and said real speed change ratio approaches said second predetermined value from said first predetermined value.

6. A method for controlling a continuously variable automatic transmission, said transmission converting and transmitting a rotation speed of an output shaft of a vehicle engine in a stepless manner via an actuator to a drive shaft of said vehicle, comprising the steps of:

detecting a driving state of said vehicle, setting a target speed change ratio from a detected driving state, detecting a real speed change ratio of said transmission, computing a predetermined dynamic characteristic estimated value based on the real speed change ratio of said transmission, computing a first speed change ratio command value from said dynamic characteristic estimated value, said target speed change ratio, and said real speed change ratio, computing an operation command value depending on a final speed change ratio command value, controlling said actuator based on said operation command value computing a speed change ratio conversion value corresponding to a speed change ratio from said operation command value, determining a low pass filter input value by applying said speed change ratio conversion value and said speed change ratio command value with a predetermined low pass filter input adjusting coefficient, computing a first external disturbance compensating output value by inputting said low pass filter input value to a preset input low pass filter, computing a second external disturbance compensating output value by inputting said real speed change ratio to a preset filter, outputting an external disturbance compensating output value obtained by subtracting said first external disturbance compensating output value from said second external disturbance compensating output value, and computing the final speed change ratio command value by subtracting said external disturbance compensating output value from said first speed change ratio command value.

7. A control method as defined in claim 6, wherein said low pass filter is specified by the following Equation A and said preset filter is specified by the following Equation B;

Equation A:

First external disturbance compensating output value $$= \frac{1}{T_H(i_p) \cdot s + 1} \cdot e^{-L \cdot s} \cdot i_{pL}$$

where,
$T_H(i_p)$=cutoff frequency of the low pass filter
L=dead time
s=Laplacian operator
$i_{pL}$=low pass filter input value Equation B:

Second external disturbance compensating output value $$= \frac{T_P(i_p) \cdot s + 1}{T_H(i_p) \cdot s + 1} \cdot i_{pR}$$

where,
$T_P(i_p)$=time constant of CVT
$i_{pR}$=preset filter input value.

8. A control method as defined in claim 6, wherein said low pass filter input value determining step determines said low pass filter input adjusting coefficient based on a difference between said target speed change ratio and said real speed change ratio.

9. A control method as defined in claim 8, wherein said low pass filter input value determining step comprises a step of setting a low pass filter input adjusting coefficient such that only said speed change ratio command value is applied to said low pass filter input value when a difference between said target speed change ratio and said real speed change ratio is less than a first predetermined value, and only said speed change ratio conversion value is applied to said low pass filter input value when said difference exceeds a second predetermined value larger than the first predetermined value.

10. A control method as defined in claim 9, wherein said low pass filter input value determining step determines a low pass filter input value by the following equation:

---

Low pass filter input value =
(low pass filter input adjusting coefficient) × (speed change ratio command value) + (low pass filter input adjusting coefficient − 1) × (speed change ratio conversion value)

--- wherein, said low pass filter input adjusting coefficient setting step decreases said low pass filter input adjusting coefficient from 1 to 0 as a difference between said target speed change ratio and said real speed change ratio approaches said second predetermined value from said first predetermined value.

* * * * *